United States Patent
Chang et al.

(10) Patent No.: US 9,992,411 B2
(45) Date of Patent: Jun. 5, 2018

(54) ELECTRONIC DEVICE HAVING A PHOTOGRAPHING FUNCTION AND PHOTOGRAPHING METHOD THEREOF

(71) Applicant: Wistron Corp., New Taipei (TW)

(72) Inventors: Yung-Yen Chang, New Taipei (TW); Haiyan Jiang, New Taipei (TW)

(73) Assignee: Wistron Corp., New Taipei (TW)

( * ) Notice: Subject to any disclaimer, the term of this patent is extended or adjusted under 35 U.S.C. 154(b) by 504 days.

(21) Appl. No.: 14/588,879

(22) Filed: Jan. 2, 2015

(65) Prior Publication Data

US 2016/0057344 A1    Feb. 25, 2016

(30) Foreign Application Priority Data

Aug. 19, 2014    (CN) .......................... 2014 1 0409655

(51) Int. Cl.
*H04N 5/00*      (2011.01)
*H04N 5/232*     (2006.01)

(52) U.S. Cl.
CPC ..... *H04N 5/23238* (2013.01); *H04N 5/23216* (2013.01); *H04N 5/23293* (2013.01)

(58) Field of Classification Search
CPC ................................................ H04N 5/23238
USPC .......................................................... 348/38
See application file for complete search history.

(56) References Cited

U.S. PATENT DOCUMENTS

| | | | |
|---|---|---|---|
| 2003/0160886 A1* | 8/2003 | Misawa ............... | H04N 5/2253 348/347 |
| 2006/0164382 A1* | 7/2006 | Kulas .................... | G06F 1/1626 345/156 |
| 2008/0024596 A1* | 1/2008 | Li ......................... | H04N 5/2257 348/47 |
| 2008/0239135 A1* | 10/2008 | Tamura .............. | H04N 13/0217 348/335 |
| 2009/0148149 A1* | 6/2009 | Chishima ............... | G03B 17/04 396/326 |
| 2009/0244019 A1* | 10/2009 | Choi ..................... | G06F 3/0482 345/173 |
| 2010/0083190 A1* | 4/2010 | Roberts ............... | G06F 3/04883 715/863 |
| 2013/0141349 A1* | 6/2013 | Song ....................... | G06F 21/36 345/173 |

(Continued)

FOREIGN PATENT DOCUMENTS

CN          101073253 A        11/2007

*Primary Examiner* — Dave Czekaj
*Assistant Examiner* — Shanika Brumfield

(57) ABSTRACT

An electronic device with photographing function is provided. The electronic device includes a first image-capturing unit, a second image-capturing unit, a touch display screen and a processing unit. The first image-capturing unit includes a straight photosensitive unit. The second image-capturing unit includes a transverse photosensitive unit. The processing unit is coupled to the first image-capturing unit, the second image-capturing unit and the touch display screen. The processing unit determines, according to the user's operation of the electronic device, to use the straight photosensitive unit of the first image-capturing unit to capture a first image from a pickup target or to use the transverse photosensitive unit of the second image-capturing unit to capture a second image from the pickup target.

14 Claims, 9 Drawing Sheets

(56) References Cited

U.S. PATENT DOCUMENTS

| | | | | |
|---|---|---|---|---|
| 2015/0105123 A1* | 4/2015 | Song | ............... | H04M 1/0264 |
| | | | | 455/556.1 |
| 2015/0116544 A1* | 4/2015 | Xu | ............... | H04N 5/2351 |
| | | | | 348/234 |
| 2015/0186004 A1* | 7/2015 | Gordon | ............... | G06F 3/0488 |
| | | | | 345/173 |
| 2016/0154559 A1* | 6/2016 | Yu | ............... | G06F 3/0488 |
| | | | | 715/769 |

* cited by examiner

ELECTRONIC DEVICE HAVING A PHOTOGRAPHING FUNCTION AND PHOTOGRAPHING METHOD THEREOF

CROSS REFERENCE TO RELATED APPLICATION

The present application is based on, and claims priority from, China (International) Application Serial Number 201410409655.4, filed. Aug. 19, 2014, the invention of which is hereby incorporated by reference herein in its entirety.

TECHNICAL FIELD

The disclosure relates to an electronic device with a photographing function, and more particularly to an electronic device with two camera lenses, and the photographing method thereof.

BACKGROUND

With the advancement of technology and the rapid adoption of smartphones and tablet PCs, the pixels of the built-in camera modules in smartphones and tablet PCs are increasing in number. Therefore, people usually only carry out smartphone or tablet to meet their photography requirements. Even so, there are still some shortcomings. For example, to find an appropriate view, people usually need to adjust the direction and position of the smartphone or tablet. For example, when the smartphone or tablet PC is upright, people cannot take a panorama photograph and thus people need to get the smartphone or tablet horizontal to do so. In view of this, the present disclosure provides an electronic device with a photographing function and a corresponding photographing method to resolve the above problem.

SUMMARY

An embodiment of the present disclosure provides an electronic device with photographing function. The electronic device comprises a first image-capturing unit, a second image-capturing unit, a touch display screen, and a processing unit. The first image-capturing unit comprises a straight photosensitive unit. The second image-capturing unit comprises a transverse photosensitive unit. The processing unit is coupled to the first image-capturing unit, the second image-capturing unit and the touch display screen. According to the user's operation of the electronic device, the processing unit determines to use the straight photosensitive unit of the first image-capturing unit to capture a first image from a pickup target or to use the transverse photosensitive unit of the second image-capturing unit to capture a second image from the pickup target.

An embodiment of the present disclosure provides a photographing method. The photographing method comprises disposing a first image-capturing unit having a straight photosensitive unit in an electronic device with photographing function; disposing a second image-capturing unit having a transverse photosensitive unit in the electronic device; and determining, according to the user's operation of the electronic device, to use the straight photosensitive unit of the first image-capturing unit to capture a first image from a pickup target or to use the transverse photosensitive unit of the second image-capturing unit to capture a second image from the pickup target.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

Figure 1A:
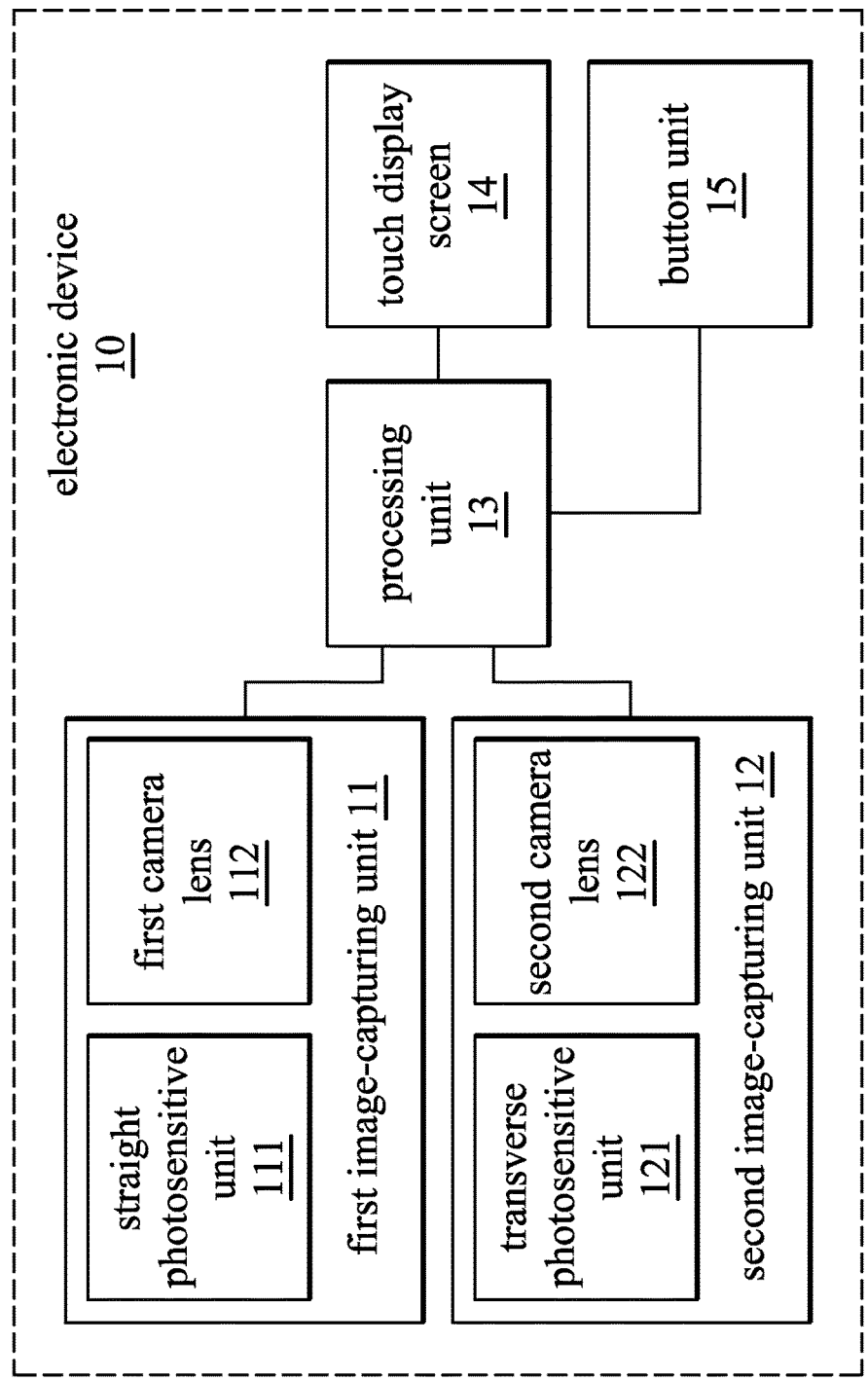
FIG. 1A shows a block diagram of an electronic device 10 according to a first embodiment of the present disclosure.

FIG. 1A shows a block diagram of an electronic device 10 according to a first embodiment of the present disclosure. In the first embodiment, the electronic device 10 comprises a first image-capturing unit 11, a second imaging 12, a processing unit 13, a touch display screen 14 and a button unit 15. The first image-capturing unit 11 comprises a straight photosensitive unit 111 and a first camera lens 112. The second image-capturing unit 12 comprises a transverse photosensitive unit 121 and a second camera lens 122. The straight photosensitive unit 111 and the transverse photosensitive unit 121 can be a Charge Coupled Device (CCD) sensor or a Complementary Metal-Oxide Semiconductor (CMOS) sensor. In the first embodiment, the first camera lens 112 and the second camera lens 122 are disposed on the same plane of the electronic device 10 and the first camera lens 112 is adjacent to second camera lens 122. Through the above configuration, the first image-capturing unit 11 is used to capture a straight first image from a pickup target, and the second image-capturing unit 12 is used to capture a transverse second image from the pickup target. The processing unit 13 is coupled to the first image-capturing unit 11, the second image-capturing unit 12, the touch display screen 14 and the button unit 15. According to the user's operation of the electronic device 10, the processing unit 13 determines to use the straight photosensitive unit 111 of the first image-capturing unit 11 to capture a first image from a pickup target or to use the transverse photosensitive unit 121 of the second image-capturing unit 12 to capture a second image from the pickup target.

Figure 1B:
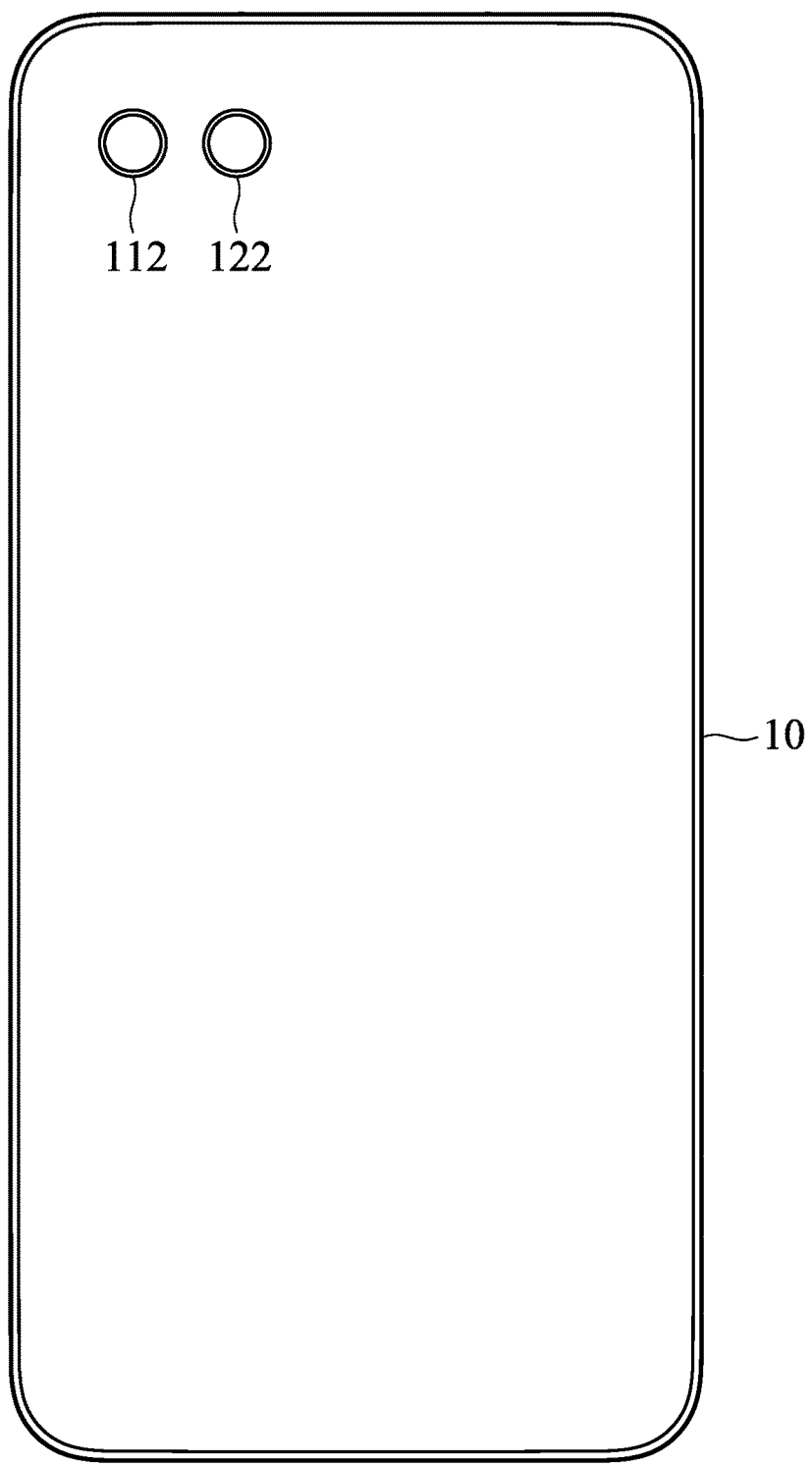
FIG. 1B shows the rear of the electronic device 10 according to a second embodiment of the present disclosure.

FIG. 1B shows the rear of the electronic device 10 according to a second embodiment of the present disclosure. In the second embodiment, the electronic device 10 is a smartphone, but the present disclosure is not limited thereto. As shown in FIG. 1B, the first camera lens 112 and the second camera lens 122 are disposed on the rear of the electronic device 10. Hence the first camera lens 112 and the second camera lens 122 can capture the image from the same pickup target. In the second embodiment, the user uses his finger to produce a sliding trajectory on the touch display screen 14 disposed on the direct side of the electronic device 10. According to the sliding trajectory, the electronic device 10 determines to use the first camera lens 112 or the second camera lens 122 to capture images. The details about switching between the first camera lens 112 and the second camera lens 122 are described in the next embodiments.

Figure 2A:
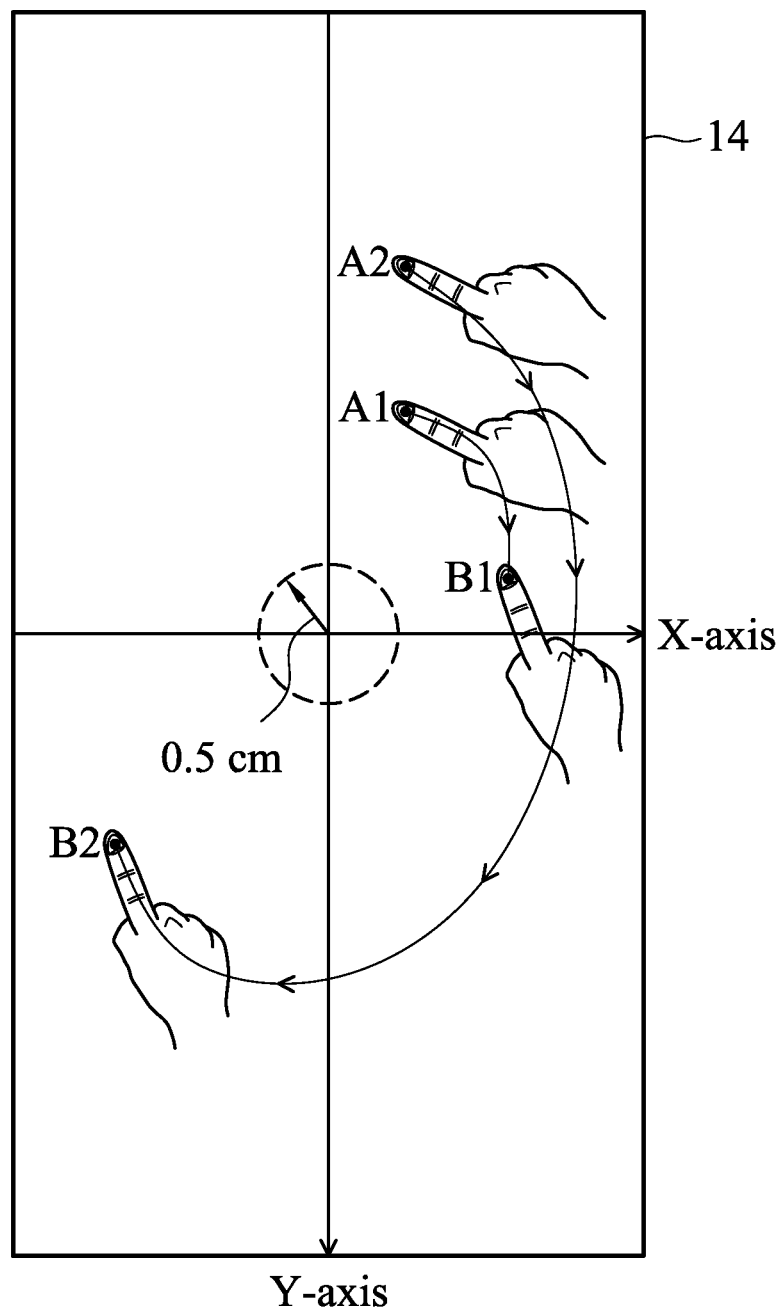
FIG. 2A shows a schematic diagram illustrating how the electronic device 10 switches the first camera lens 112 to the second camera lens 122 according to a third embodiment of the present disclosure.

FIG. 2A shows a schematic diagram illustrating how the electronic device 10 switches the first camera lens 112 to the second camera lens 122 according to a third embodiment of the present disclosure. In the third embodiment, the initial setting of the electronic device 10 is using the first camera lens 112 to capture images. The user chooses to enter a right-handed mode for manually adjusting the camera angle on the touch display screen 14 of the electronic device 10. In the right-handed mode, the user uses his finger to produce a sliding trajectory on the touch display screen 14 by sliding from point A1 to point B1 (shown in FIG. 2A). Then the processing unit 13 sets a central point on the touch display screen 14, for example, the intersection of two diagonals of the touch display screen 14. The processing unit 13 uses the central point as an original point to construct a virtual x-axis and a virtual y-axis (shown in FIG. 2A) and finds the corresponding coordinate values of A1(x1, y1) and B1(x2, y2). Through complying with the conditions of "the x-axis coordinate value x2 of point B1 is higher than the x-axis coordinate value x1 of point A1", "the y-axis coordinate value y2 of point B1 is higher than the y-axis coordinate value y1 of point A1" and "the sliding trajectory does not pass through the virtual x-axis or virtual y-axis", the processing unit judges the adjustment angle θ to be less than 90° (i.e. 0°<θ<90°). At this time, the processing unit 13 switches the first lens 112 to the second lens 122 according to the above adjustment angle θ and sets the second lens 122 to capture images. Therefore the user instructs the electronic device 10 to use the second lens 122 to capture images through the sliding trajectory which is made by sliding clockwise less than 90° on the touch display screen 14.

Similarly, as shown in FIG. 2A, the user uses his finger to produce a sliding trajectory on the touch display screen 14 by sliding from point A2 to point B2. Through complying with the conditions of "the x-axis coordinate value of point B2 is less than the x-axis coordinate value of point A2", "the y-axis coordinate value of point B2 is higher than the y-axis coordinate value of point A2" and "the sliding trajectory respectively passes through the virtual x-axis and the virtual y-axis once", the processing unit 13 judges the adjustment angle θ to be greater than 90° (i.e. 90°<θ<270°). At this time, the processing unit 13 chooses the first lens 112 according to the above adjustment angle θ and still sets the first lens 112 to capture images. Therefore the user instructs the electronic device 10 to use the first lens 112 to capture images through the sliding trajectory which is made by sliding clockwise greater than 90° on the touch display screen 14.

It is worth noting that the processing unit 13 judges the above user's operation (i.e. sliding from point A1 to point B1 or from point A2 to point B2) as invalid if the sliding trajectory between point A1 and point B1 is not continuous and smooth, for example if there is a break point in the sliding trajectory. Furthermore, the processing unit 13 judges the above user's operation (i.e. sliding from point A1 to point B1 or from point A2 to point B2) as invalid if the distance between the sliding trajectory and the central point is less than a predetermined distance, for example 0.5 cm.

Figure 2B:
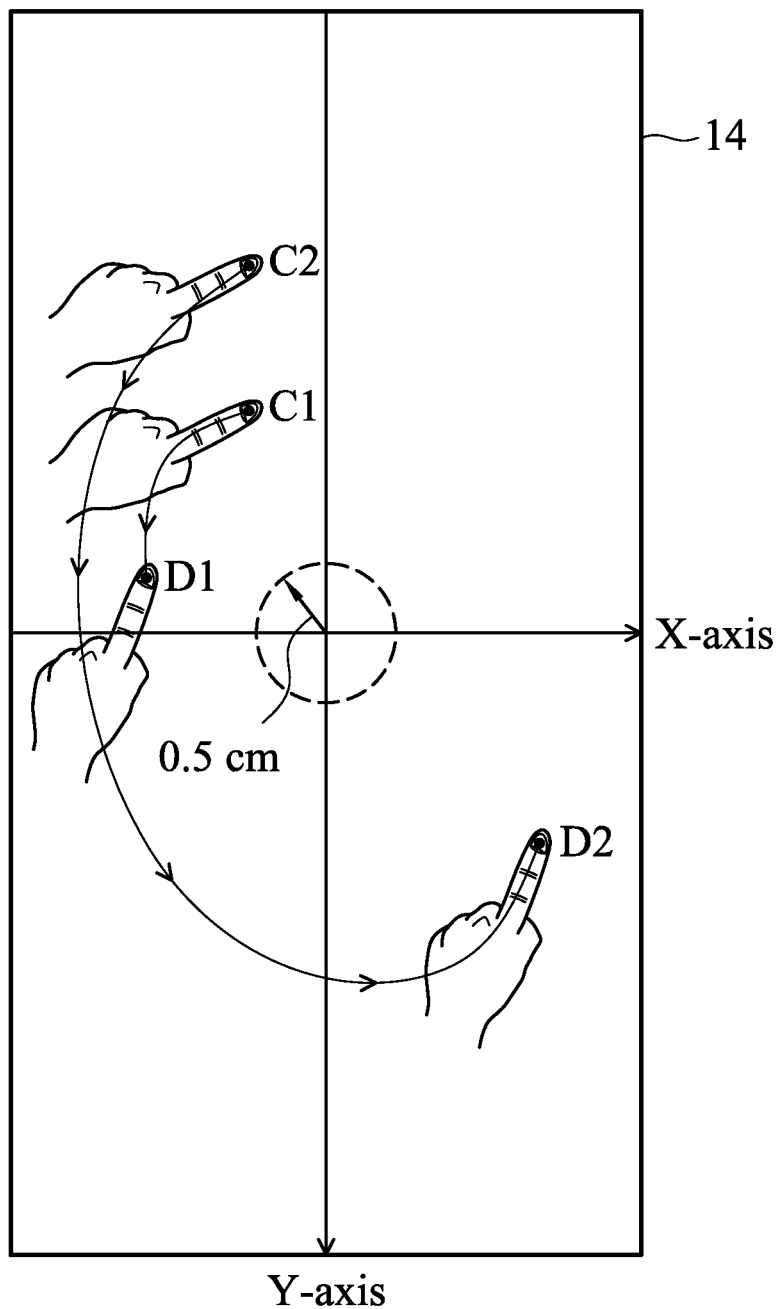
FIG. 2B shows a schematic diagram illustrating how the electronic device 10 switches the first camera lens 112 to the second camera lens 122 according to a fourth embodiment of the present disclosure.

FIG. 2B shows a schematic diagram illustrating how the electronic device 10 switches the first camera lens 112 to the second camera lens 122 according to a fourth embodiment of the present disclosure. Because the operating direction of a left-handed user or a single-handed user is opposite to the operating direction of a right-handed user or a two-handed user on the touch display screen 14, the fourth embodiment of the present disclosure considers the user's operations of left-handed users or single-handed users. In the fourth embodiment, the initial setting of the electronic device 10 is using the first camera lens 112 to capture images. The user chooses to enter a left-handed mode for manually adjusting the camera angle on the touch display screen 14 of the electronic device 10. In the left-handed mode, user uses his finger to produce the sliding trajectory on the touch display screen 14 by sliding from point C1 to point D1 (shown in FIG. 2B). Then the processing unit 13 sets a central point on the touch display screen 14, for example, the intersection of two diagonals of the touch display screen 14. The processing unit 13 uses the central point as an original point to construct a virtual x-axis and a virtual y-axis (shown in FIG. 2B) and finds the corresponding coordinate values of C1(x1, y1) and D1(x2, y2).

Through complying with the conditions of "the x-axis coordinate value of point C1 is higher than the x-axis coordinate value of point D1", "the y-axis coordinate value of point C1 is less than the y-axis coordinate value of point D1" and "the sliding trajectory does not pass through the virtual x-axis or virtual y-axis", the processing unit judges the adjustment angle θ to be less than 90° (i.e. 0°<θ<90°). At this time, the processing unit 13 switches the first lens 112 to the second lens 122 according to the above adjustment angle θ and sets the second lens 122 to capture images. Therefore the user instructs the electronic device 10 to use the second lens 122 to capture images through the sliding trajectory which is made by sliding counterclockwise less than 90° on the touch display screen 14.

Similarly, as shown in FIG. 2B, the user uses his finger to produce the sliding trajectory on the touch display screen 14 by sliding from point C2 to point D2. Through complying with the conditions of "the x-axis coordinate value of point D2 is large than the x-axis coordinate value of point C2", "the y-axis coordinate value of point D2 is higher than the y-axis coordinate value of point C2" and "the sliding trajectory respectively passes through the virtual x-axis and the virtual y-axis once", the processing unit judges the adjustment angle θ to be located between 90° and 270° (i.e. 90°<θ<270°). At this time, the processing unit 13 chooses the first lens 112 according to the above adjustment angle θ and still sets the first lens 112 to capture images. Therefore the user instructs the electronic device 10 to use the first lens 112 to capture images through the sliding trajectory which is made by sliding counterclockwise greater than 90° on the touch display screen 14.

As with the third embodiment, the sliding trajectories between point C1 and point D1 or point C2 and point D2 in the fourth embodiment should be continuous and smooth, and the distance between the sliding trajectory and the central point should be greater than a predetermined distance. Otherwise the processing unit 13 judges the above user's operation (i.e. sliding from point C1 to point D1 or from point C2 to point D2) as invalid.

Figure 2C:
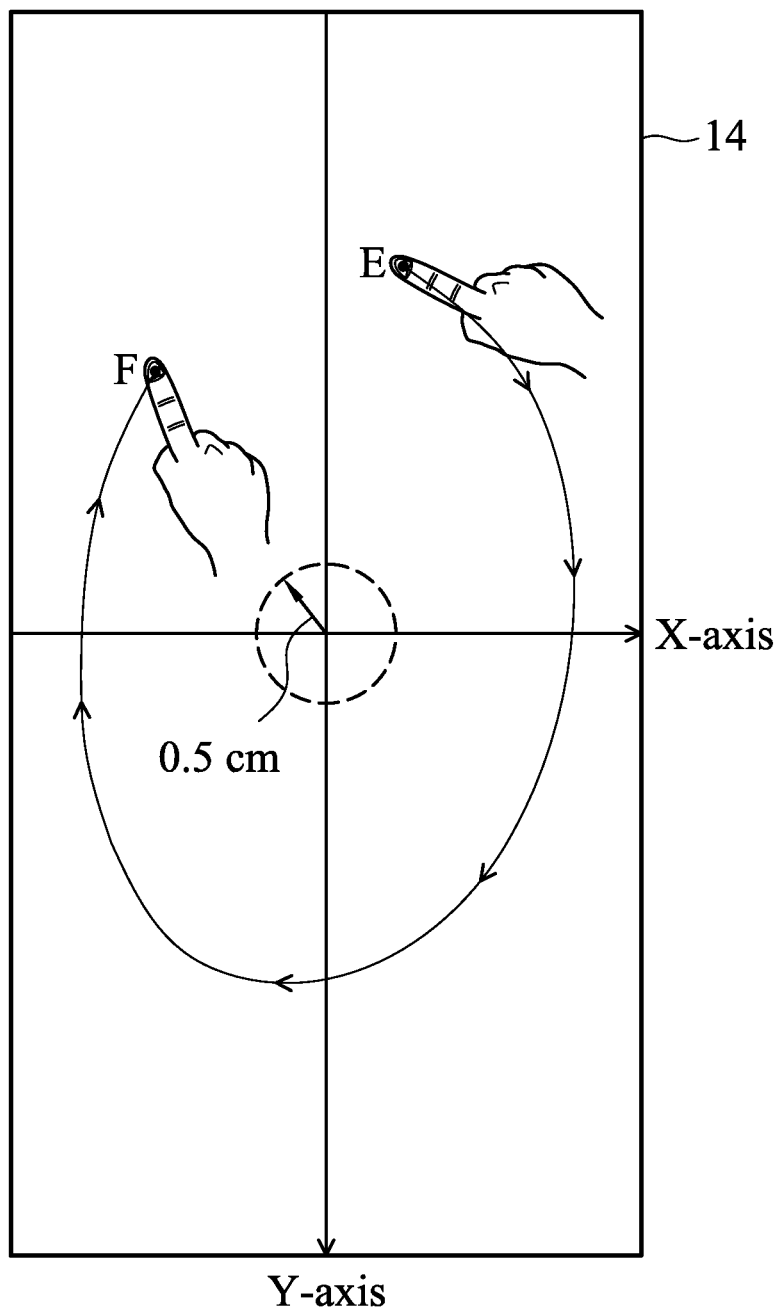
FIG. 2C shows a schematic diagram illustrating how the electronic device 10 captures the upside-down image according to a fifth embodiment of the present disclosure.

FIG. 2C shows a schematic diagram illustrating how the electronic device 10 captures the upside-down image according to a fifth embodiment of the present disclosure. The fifth embodiment of the present disclosure considers that the user wants to capture an upside-down image, such as shooting the reflected image in a lake. In the fifth embodiment, the initial setting of the electronic device 10 is using the first camera lens 112 to capture images. The user chooses to enter a right-handed mode for manually adjusting the camera angle on the touch display screen 14 of the electronic device 10. In the right-handed mode, user uses his finger to produce the sliding trajectory on the touch display screen 14 by sliding from point E to point F (shown in FIG. 2C). Through complying with the conditions of "the x-axis coordinate value of point E is greater than the x-axis coordinate value of point F", "the y-axis coordinate value of point E is less than the y-axis coordinate value of point F" and "the sliding trajectory passes through the virtual x-axis and the virtual y-axis three times (passes through the virtual x-axis two times and passes through the virtual y-axis once)", the processing unit judges the adjustment angle θ to be greater than 180° (i.e. 180°<θ<360°). At this time, the processing unit 13 chooses the first lens 112 according to the above adjustment angle θ and still sets the first lens 112 to capture images. It is worth noting that the above three times also comprise passing through the virtual x-axis once and passing through the virtual y-axis two times (this time, the user is sliding clockwise from the second quadrant to the third quadrant).

The difference between the third and fifth embodiment is that, in the fifth embodiment, the processing unit 13 rotates the image captured by the first lens 112 and displays the upside-down image on the touch display screen 14 after the processing unit 13 judges the adjustment angle θ to be greater than 180°. Therefore the user instructs the electronic device 10 to use the first lens 112 to capture upside-down images through the sliding trajectory which is done by sliding clockwise greater than 180° on the touch display screen 14.

As with the third embodiment, the sliding trajectories between point E and point F in the fifth embodiment should be continuous and smooth, and the distance between the sliding trajectory and the central point should be greater than a predetermined distance. Otherwise the processing unit 13 judges the above user's operation (i.e. sliding from point E to point F) as invalid.

The sixth embodiment of the present disclosure is another embodiment of switching from the first lens 112 to the second lens 122. In the sixth embodiment, the user, by turning or touching the button unit 15 disposed on the electronic device 10, selects the first lens 112 or the second lens 122. According to the above user's operation (turning or touching the button unit 15), the user determines to use the straight photosensitive unit 111 of the first image-capturing unit 11 to capture a first image from the pickup target or to use the transverse photosensitive unit 121 of the second image-capturing unit 12 to capture a second image from the pickup target. In the sixth embodiment, the button unit 15 can be a mechanical rotation button disposed on the photographic device or a functional key on the smartphone, but the present disclosure is not limited thereto.

Figure 3A:
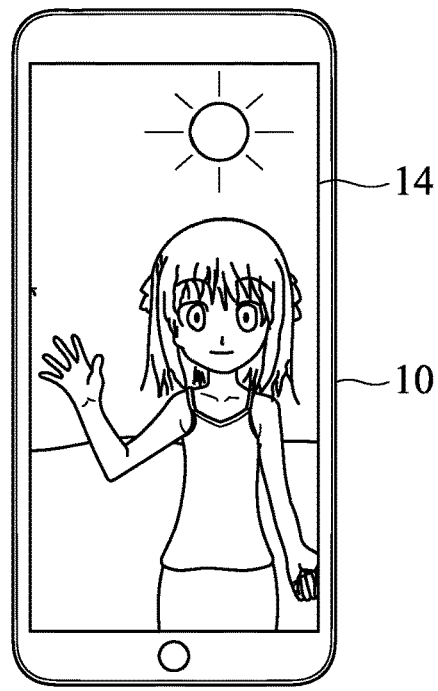
FIG. 3A shows a schematic diagram illustrating how the first image-capturing unit 11 captures a straight first image from a pickup target according to a seventh embodiment of the present disclosure.

FIG. 3A shows a schematic diagram illustrating how the first image-capturing unit 11 captures a straight first image from a pickup target according to a seventh embodiment of the present disclosure. In the seventh embodiment, the electronic device 10 is a smartphone having a photographing function. As shown in FIG. 3A, the user straightens the smartphone to capture a straight image of a person, wherein the user uses the first image-capturing unit 11 to capture images.

Figure 3B:
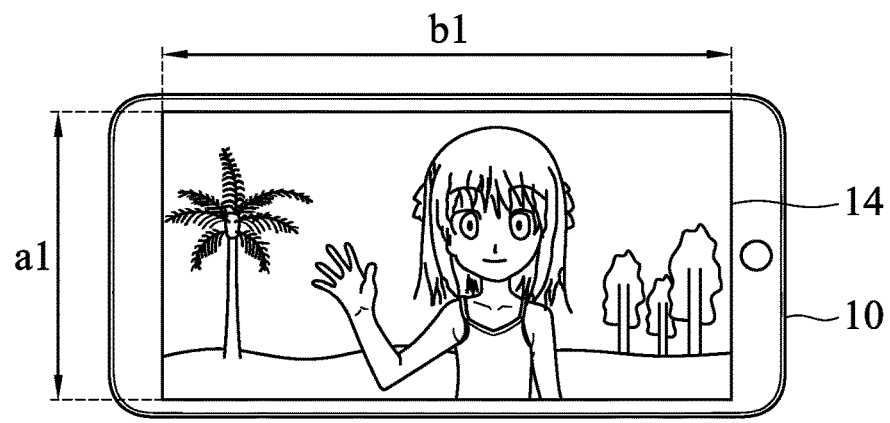
FIG. 3B shows a schematic diagram illustrating how the first image-capturing unit 11 captures a transverse first image from a pickup target according to the seventh embodiment of the present disclosure.

FIG. 3B shows a schematic diagram illustrating how the first image-capturing unit 11 captures a transverse first image from a pickup target according to the seventh embodiment of the present disclosure. As shown in FIG. 3B, the user holds the smartphone horizontally to capture a transverse first image of the same person, wherein the user also uses the first image-capturing unit 11 to capture images.

Figure 3C:
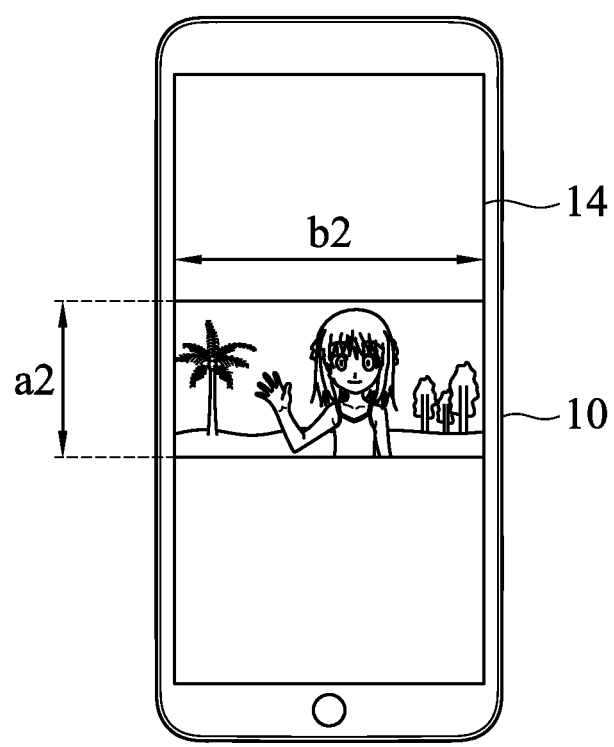
FIG. 3C shows a schematic diagram illustrating how the second image-capturing unit 12 captures a second image from a pickup target according to the seventh embodiment of the present disclosure.

FIG. 3C shows a schematic diagram illustrating how the second image-capturing unit 12 captures a second image from a pickup target according to the seventh embodiment of the present disclosure. In the seventh embodiment, the user operates the electronic device 10 (the smartphone) switching the first lens 112 to the second lens 122 according to the method described in the third or fourth embodiments. Then, as shown in FIG. 3C, the user straightens the smartphone to capture a transverse second image from the same person, wherein the user uses the second image-capturing unit 12 to capture images. At this time, the aspect ratio of the second image shown in FIG. 3C is as the same as the aspect ratio (b1/a1) of the first image shown in FIG. 3B. In order to completely show the whole second image on the upright touch display screen 14, the processing unit 13 needs to adjust the second image to conform to the size of the image displayed by the upright touch display screen. As shown in FIG. 3C, the length b2 and width a2 of the adjusted second image should meet the requirement of having a scaling ratio n=(a1/a2)=(b1/b2), wherein n is determined by the aspect ratio of the touch display screen 14. Therefore the user can capture straight or transverse images when the user straightens the smartphone using the method of the seventh embodiment. In other words, the user does not need to hold the smartphone horizontally to capture a transverse image.

Figure 4A:
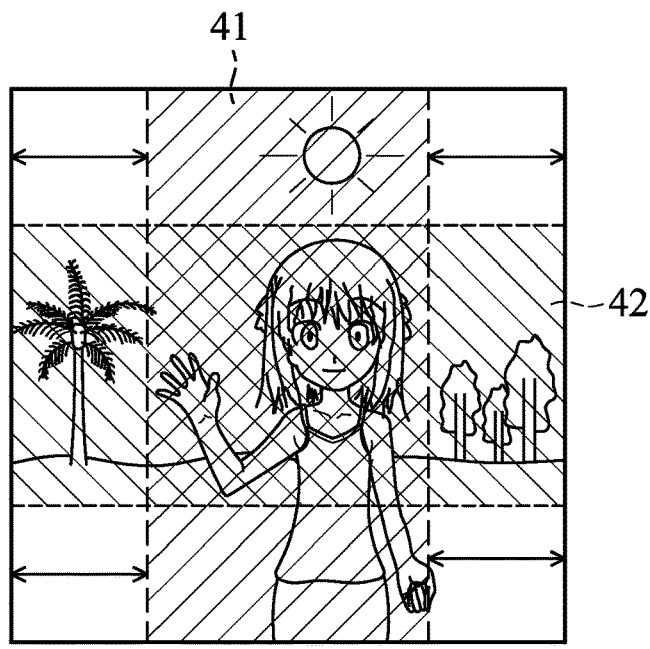
FIG. 4A and FIG. 4B show a user capturing a panorama image by operating the electronic device 10 according to an eighth embodiment of the present disclosure.
Figure 4B:
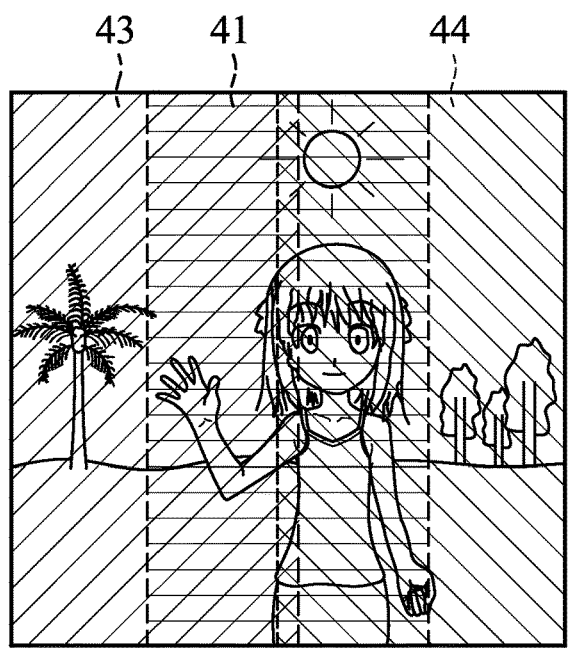

FIG. 4A and FIG. 4B show a user capturing a panorama image by operating the electronic device 10 according to an eighth embodiment of the present disclosure. In the eighth embodiment, the user chooses to enter a panorama mode for manually adjusting the camera angle on the touch display screen 14 of the electronic device 10. In the panoramic mode, the processing unit 13 simultaneously captures a third image 41 by the first image-capturing unit 11 and a fourth image 42 by the second image-capturing unit 12. In FIG. 4A, the straight dashed rectangular represents the third image 41, and the transverse dashed rectangular represents the fourth image 42. After overlapping the third image 41 and the fourth image 42, the panoramic image shown in FIG. 4A only lacks four corners (right upper/lower right/left upper/lower left) of view. At this time, the user can choose to move the electronic device 10 up or down and left or right to capture images for filling the four corners of views. As shown in FIG. 4B, the user choose to move the electronic device 10 left or right to capture images for filling the four corners of views. At this time, the processing unit 13 instructs of the first image-capturing unit 11 to capture a plurality of the third images 43 and 44 when the user moves the electronic device 10 left or right. Finally, the processing unit 13 processes the plurality of third images 41, 43 and 44 and the fourth image 44 to obtain the panoramic image.

Figure 5:
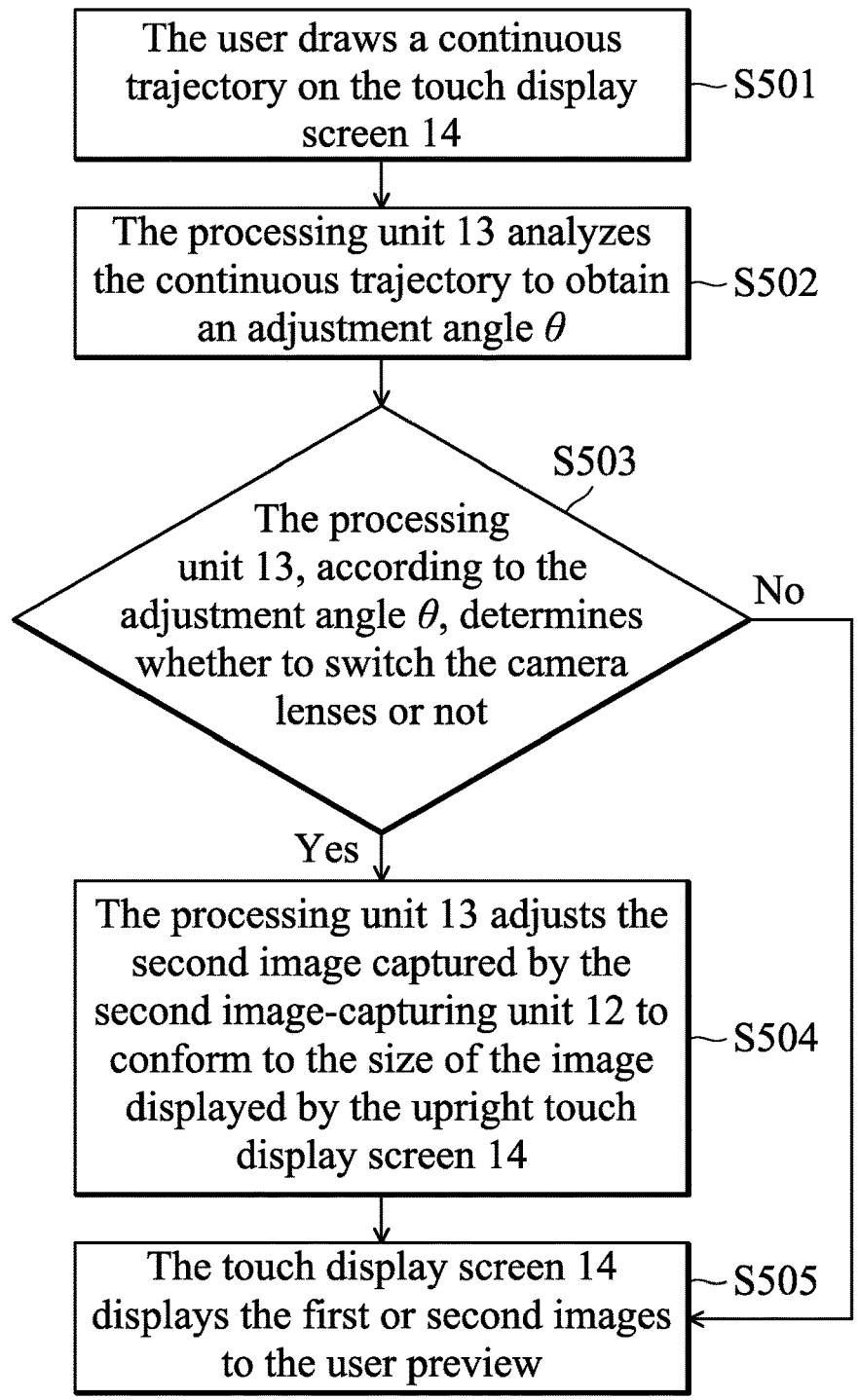
FIG. 5 shows a flow diagram of the photographing method according to an embodiment of the present disclosure.

FIG. 5 shows a flow diagram of the photographing method according to an embodiment of the present disclosure. In step S501, the user draws a continuous trajectory on the touch display screen 14, and the method proceeds to step S502. In step S502, the processing unit 13 analyzes the continuous trajectory to obtain an adjustment angle θ, and the method proceeds to step S503. In step S503, the processing unit 13, according to the adjustment angle θ, determines whether to switch the camera lenses or not (switching from the first lens 112 to the second lens 122). If yes, the method proceeds to step S504; Otherwise, the method proceeds to step S505. In step S504, the processing unit 13 further adjusts the second image captured by the second image-capturing unit 12 to conform to the size of the image displayed by the upright touch display screen 14, and the method proceeds to step S505. In step S505, the touch display screen 14 displays the first or second images to the user preview, and the user determines whether to shoot the image.

While the present disclosure has been described by way of example and in terms of preferred embodiment, it should be understood that the present disclosure is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. An electronic device with photographing function, comprising:
   a first image-capturing unit having a straight photosensitive unit, the straight photosensitive unit arranged to capture images having a first aspect ratio when the electronic device is positioned in a first orientation;
   a second image-capturing unit having a transverse photosensitive unit, the transverse photosensitive unit arranged to capture images having a second aspect ratio when the electronic device is positioned in the first orientation, wherein the first and second aspect ratios are different;
   a touch display screen; and
   a processing unit coupled to the first image-capturing unit, the second image-capturing unit and the touch display screen, determining, according to the user's operation of the electronic device, to use the straight photosensitive unit of the first image-capturing unit to capture a first image from a pickup target or to use the transverse photosensitive unit of the second image-capturing unit to capture a second image from the pickup target,
   wherein the first image-capturing unit and the second image-capturing unit respectively comprise a first camera lens and a second camera lens,
   wherein the first and second camera lenses are disposed on the same planar surface of the electronic device and the first camera lens is adjacent to second camera lens.

2. The electronic device with photographing function of claim 1, wherein when the processing unit obtains the second image by the transverse photosensitive unit, the processing unit further adjusts the dimensions of the second image for display on the touch display screen which is upright.

3. The electronic device with photographing function of claim 1, wherein when the user's operation is a sliding trajectory on the touch display screen made by the user, the processing unit selects the first or second image-capturing unit according to the coordinate values of a starting point and an end point of the sliding trajectory.

4. The electronic device with photographing function of claim 3, wherein the sliding trajectory is a continuous and smooth trajectory, and the distance between the sliding trajectory and a center point of the touch display screen is greater than a predetermined value.

5. The electronic device with photographing function of claim 1, wherein the processing unit further captures at least a third image by the straight photosensitive unit of the first image-capturing unit from the pickup target and at least a fourth image by the transverse photosensitive unit of the second image-capturing unit from the pickup target, and processes the third and fourth images to obtain a panorama image.

6. The electronic device with photographing function of claim 1, further comprising a button unit coupled to the processing unit and disposed on the electronic device, wherein the user's operation is turning or touching the button unit for determining to choose the first or second image-capturing units.

7. The electronic device with photographing function of claim 1, wherein the first aspect ratio is the inverse of the second aspect ratio.

8. A photographing method comprising:
   disposing a first image-capturing unit having a straight photosensitive unit and a first camera lens in an electronic device with photographing function;
   disposing a second image-capturing unit having a transverse photosensitive unit and a second camera lens in the electronic device, wherein the first and second camera lenses are disposed on a same planar surface of the electronic device and the first camera lens is adjacent to second camera lens, and wherein the straight photosensitive unit is arranged to capture images having a first aspect ratio when the electronic device is in a first orientation, and the transverse photosensitive unit is arranged to capture images having a second aspect ratio when the electronic device is in the first orientation, wherein the first and second aspect ratios are different;
   determining, according to the user's operation of the electronic device, to use the straight photosensitive unit of the first image-capturing unit to capture a first image from a pickup target or to use the transverse photosensitive unit of the second image-capturing unit to capture a second image from the pickup target.

9. The photographing method of claim 8, further comprising:
   adjusting the dimensions of the second image for display on the touch display screen which is upright.

10. The photographing method of claim 8, wherein when the user's operation is a sliding trajectory on the touch display screen made by the user, the processing unit selects the first or second image-capturing unit according to the coordinate values of a starting point and an end point of the sliding trajectory.

11. The photographing method of claim 10, wherein the sliding trajectory is a continuous and smooth trajectory, and the distance between the sliding trajectory and a center point of the touch display screen is greater than a predetermined value.

12. The photographing method of claim 8, further comprising:
   capturing at least a third image by the straight photosensitive unit of the first image-capturing unit from the pickup target and at least a fourth image by the transverse photosensitive unit of the second image-capturing unit from the pickup target; and
   processing the third and fourth images to obtain a panorama image.

13. The photographing method of claim 8, further comprising:
   disposing a button unit in the electronic device, wherein the user's operation is turning or touching the button unit for determining to choose the first or second image-capturing units.

14. The photographing method of claim 8, wherein the first aspect ratio is the inverse of the second aspect ratio.

* * * * *